United States Patent
Mills et al.

(10) Patent No.: US 11,067,545 B2
(45) Date of Patent: Jul. 20, 2021

(54) CONTINUOUS WAVE ULTRASOUND FOR ANALYSIS OF A SURFACE

(71) Applicant: THE UNIVERSITY OF SHEFFIELD, Sheffield South Yorkshire (GB)

(72) Inventors: Robin Mills, Sheffield South Yorkshire (GB); Robert S. Dwyer-Joyce, Hope Valley (GB); Matthew Marshall, Sheffield South Yorkshire (GB)

(73) Assignee: THE UNIVERSITY OF SHEFFIELD, Sheffield (GB)

( * ) Notice: Subject to any disclaimer, the term of this patent is extended or adjusted under 35 U.S.C. 154(b) by 416 days.

(21) Appl. No.: 16/064,719

(22) PCT Filed: Dec. 21, 2016

(86) PCT No.: PCT/GB2016/054024
§ 371 (c)(1),
(2) Date: Jul. 24, 2018

(87) PCT Pub. No.: WO2017/109490
PCT Pub. Date: Jun. 29, 2017

(65) Prior Publication Data
US 2018/0372695 A1    Dec. 27, 2018

(30) Foreign Application Priority Data

Dec. 22, 2015  (GB) ...................... 1522677

(51) Int. Cl.
*G01N 29/04* (2006.01)
*G01N 29/34* (2006.01)
(Continued)

(52) U.S. Cl.
CPC ......... *G01N 29/345* (2013.01); *G01B 17/025* (2013.01); *G01N 29/041* (2013.01);
(Continued)

(58) Field of Classification Search
CPC .... G01N 29/041; G01N 29/043; G01N 29/12; G01N 29/345; G01N 29/348;
(Continued)

(56) References Cited

U.S. PATENT DOCUMENTS

| 3,306,100 A | 2/1967 | Wilhelm et al. |
| 3,822,587 A | 7/1974 | Makino et al. |

(Continued)

FOREIGN PATENT DOCUMENTS

| AU | 2014218392 A1 | 9/2014 |
| DE | 101 34 159 A1 | 3/2002 |

(Continued)

OTHER PUBLICATIONS

PCT ISR and Written Opinion of the ISA for international application No. PCT/GB2016/054024, dated Apr. 20, 2017, 15 pages.

(Continued)

*Primary Examiner* — Herbert K Roberts
(74) *Attorney, Agent, or Firm* — Patterson Thuente Pedersen. P.A.

(57) ABSTRACT

A continuous wave ultrasound analysis device for analysing a surface of a component includes an input to receive ultrasound data relating to continuous wave, swept frequency ultrasound propagated through the component; a processing section to derive a standing wave amplitude spectrum from the received ultrasound data, and determine a property of an unconstrained layer on the surface based on the standing wave amplitude spectrum; and an output to output the determined property of the layer. A method of continuous wave ultrasound for analysing a surface is also provided.

23 Claims, 11 Drawing Sheets

(51) Int. Cl.
   *G01N 29/48* (2006.01)
   *G01B 17/02* (2006.01)
   *G01N 29/12* (2006.01)
   *G01N 29/44* (2006.01)

(52) U.S. Cl.
   CPC .......... *G01N 29/043* (2013.01); *G01N 29/12* (2013.01); *G01N 29/4427* (2013.01); *G01N 29/4436* (2013.01); *G01N 2291/044* (2013.01)

(58) Field of Classification Search
   CPC .......... G01N 29/4427; G01N 29/4436; G01B 17/02; G01B 17/025
   See application file for complete search history.

(56) References Cited

U.S. PATENT DOCUMENTS

| | | | |
|---|---|---|---|
| 3,918,294 | A | 11/1975 | Makino et al. |
| 3,975,948 | A | 8/1976 | Makino et al. |
| 4,062,227 | A | 12/1977 | Heyman |
| 4,862,384 | A * | 8/1989 | Bujard ............ G01N 11/00 702/54 |
| 5,038,615 | A | 8/1991 | Trulson et al. |
| 5,062,296 | A | 11/1991 | Migliori |
| 5,408,880 | A | 4/1995 | Rhodes et al. |
| 5,606,130 | A | 2/1997 | Sinha et al. |
| 5,686,661 | A * | 11/1997 | Singh ............ G01N 11/00 73/54.02 |
| 5,767,407 | A | 6/1998 | Sinha |
| 6,286,370 | B1 | 9/2001 | Sinha |
| 6,363,787 | B1 | 4/2002 | Carlson et al. |
| 6,644,119 | B1 | 11/2003 | Sinha |
| 8,166,801 | B2 | 5/2012 | Sinha |
| 8,176,783 | B2 | 5/2012 | Sinha |
| 2002/0186379 | A1 | 12/2002 | Drake, Jr. |
| 2003/0169186 | A1 | 9/2003 | Vopat |
| 2004/0045356 | A1 * | 3/2004 | Dwyer-Joyce ....... G01B 17/025 73/579 |
| 2009/0143681 | A1 | 6/2009 | Jurvelin et al. |
| 2014/0338463 | A1 | 11/2014 | Seaman et al. |
| 2017/0003253 | A1 * | 1/2017 | Kaneko ................ G01N 29/12 |

FOREIGN PATENT DOCUMENTS

| | | |
|---|---|---|
| JP | H09 250919 A | 9/1997 |
| JP | 2007 010543 A | 1/2007 |
| JP | 2008 116406 A | 5/2008 |
| JP | 2009 288045 A | 12/2009 |
| WO | WO 2009/075704 A2 | 6/2009 |
| WO | WO 2013/059458 A1 | 4/2013 |

OTHER PUBLICATIONS

Combined Search and Examination Report for GB application No. 1522677.2, dated Jun. 21, 2016, 9 pages.

Joseph S. Heyman, "A CW Ultrasonic Bolt-strain Monitor", Experimental Mechanics, May 1977, vol. 17, Issue 5, pp. 183-187.

M. J. Buckley, Air Force Materials Laboratory, Wright Patterson Air Force Base, Ohio 45433 and J. M. Raney, Systems Research Laboratories, Inc., 2800 Indian Ripple Road Dayton, Ohio 45440, "The Use of Continuous Wave Ultrasonic Spectroscopy for Adhesive-Bond Evaluation", 8 pages.

* cited by examiner

CONTINUOUS WAVE ULTRASOUND FOR ANALYSIS OF A SURFACE

RELATED APPLICATIONS

This application is a National Phase entry of PCT Application No. PCT/GB2016/054024 filed Dec. 21, 2016, which application claims the benefit of priority to GB Application No. 1522677.2, filed Dec. 22, 2015, the entire disclosures of which are incorporated herein by reference.

This disclosure relates to the use of ultrasound for analysis of physical systems, such as mechanical components.

BACKGROUND

Ultrasound may be used for analysis of physical systems, such as for non-destructive testing of mechanical components. Ultrasound techniques typically derive information by measuring the time-of-flight or amplitude of an ultrasound pulse in an object.

BRIEF DESCRIPTION OF THE DRAWINGS

Examples are further described hereinafter with reference to the accompanying drawings, in which.

DETAILED DESCRIPTION

According to some examples, a novel superimposed standing wave method is provided to measure the presence and properties of a medium present on a surface. According to some examples, ultrasound transmitting/receiving equipment may be provided on a "back face" of the component, such that the component is between the ultrasound equipment and the surface of interest (the surface on which the medium is present). This may facilitate a non-invasive measurement that may be carried out during a coating or layer generation process, for example. According to some examples various properties and phenomena may be determined, such as:

The thickness of a film or coating (such as paint, ice, or residual oil)

The thickness of an oil film between components

The viscosity of a layer of liquid, e.g. within a sealed vessel

According to some examples, a continuous ultrasonic wave is created inside the component. This may involve the use of a piezoelectric transducer driven with a continuous sinusoidal varying voltage, for example. The multiple wave reflections at the component boundaries interfere with the incident wave and superimpose to generate a standing wave. The amplitude and frequency of the standing wave may be recorded with time. This amplitude depends on the proportion of wave energy reflected at the boundary with the surface medium, known as the reflection coefficient. By extracting this reflection coefficient it is possible to deduce the properties of the medium at the surface. The frequency of the standing wave depends on the properties and geometry of the component and surface medium assembly. The thickness of the surface medium may be deduced by monitoring the frequency of the standing wave.

Examples may have one of more of the following features:

1. A high measurement sensitivity may be achieved in some examples. The wave may be reflected many times from the interface/surface of interest, and so the effect of the interface (e.g. changes of the interface) on the signal may be magnified. This may allow the measurement of previously un-measureable properties (e.g. thin surface films, or viscosity in thin acoustically unmatched layers).

2. A very fast response time may be achieved in some examples. In conventional pulse-echo ultrasonics, the time between successive measurements depends on the pulse repetition rate. When continuous wave measurements are used each wave peak may be a measurement point. Accordingly, according to some examples time resolution of the technique is the wave frequency.

3. Examples may be implanted using very low cost instrumentation. The use of continuous waves avoids the need for a conventional ultrasonic pulsing and receiving system. This may allow, for example, the use of low cost signal generator and capture integrated circuits (ICs).

Ultrasonic Propagation, Attenuation, Reflection, and Phase Shift

Figure 1:
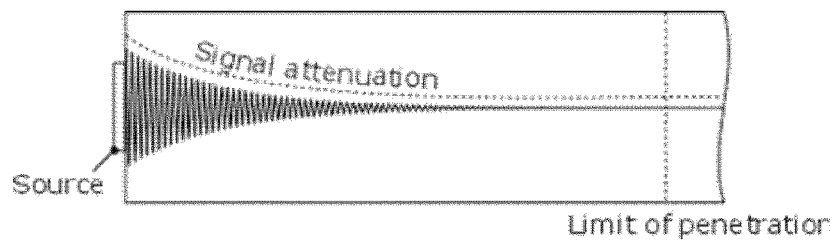
FIG. 1 illustrates attenuation of an ultrasonic wave in a material.

Ultrasound is a mechanical vibration at frequencies above that of human hearing. The vibration consists of tiny mechanical deflections that propagate through a gas, liquid, or solid. As an ultrasonic wave passes through a material it will be attenuated as a function of distance, eventually decaying to zero amplitude. FIG. 1 schematically shows an ultrasonic wave decaying in a material. There is a simple relationship between the initial amplitude of a wave, $A_0$, and the amplitude, A of the wave after it has traveled through a path length of L:

$$A = A_0 e^{L\alpha} \quad (1)$$

Where $\alpha$ is known as the attenuation coefficient, which is a property of the material in which the ultrasound propagates.

If the wave strikes a boundary or interface, a reflection will occur, the magnitude of which will depend upon the conditions at the boundary/interface. The refection coefficient, R is defined as the amplitude of the reflected wave ($A_R$) divided by the amplitude of the incident wave ($A_I$):

$$R = \frac{A_R}{A_I} \quad (2)$$

Figure 2A:
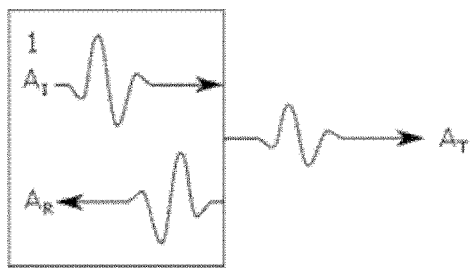
FIG. 2a illustrates reflection of an ultrasonic wave at a solid-air boundary.
Figure 2B:
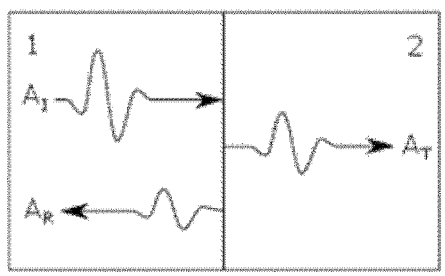
FIG. 2b illustrates reflection of an ultrasonic wave at a boundary between two materials.
Figure 2C:
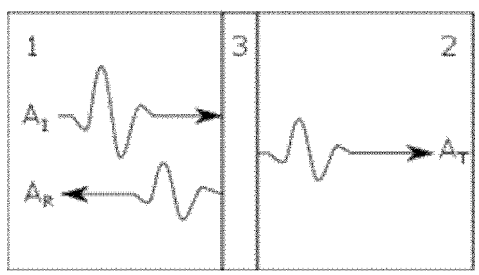
FIG. 2c illustrates reflection of an ultrasonic wave at a thin layer between two materials.

The magnitude and phase of R depends on the nature of the interface. FIG. 2a schematically shows the reflection of an ultrasonic wave at a boundary with air, FIG. 2b schematically shows the reflection of an ultrasonic wave at a boundary another material, and FIG. 2c schematically shows the reflection of an ultrasonic wave at the boundary of a thin layer between two solid components. Each of these cases will reflect a different amount of the incident wave amplitude. If the interface consists of two materials perfectly bonded together (e.g. in the arrangement of FIG. 2b), then the reflection depends on the acoustic impedance mismatch between the two materials according to:

$$R = \frac{Z_2 - Z_1}{Z_2 + Z_1} \quad (3)$$

where $z_1$ and $z_2$ are the acoustic impedance of the materials either side of the interface. For longitudinally polarised ultrasound the acoustic impedance is the product of the material density and wave speed:

$$z_1 = \rho_1 c_1 \text{ and } z_2 = \rho_2 c_2 \quad (4)$$

For the case of a reflection with a solid-air boundary (e.g. FIG. 2a) then $z_2 \ll z_1$ and practically all the wave is reflected back, $R \to 1$ and $A_R = A_I$.

FIG. 2 also illustrates that the phase of the reflected signal may change at a boundary. If the wave is reflected at a boundary between an acoustically less dense to more dense medium, the phase changes by $\phi = \pi$, if dense to less dense then $\phi = 0$.

Reflection Coefficient and Surface Medium Properties

A Three Layer System

For the case when the wave is reflected back from a three layer system (e.g. FIG. 2c), the reflection coefficient, R depends on the acoustic impedance of the three materials (Kinsler et al., Fundamentals of Acoustics, Wiley & Sons):

$$R = \frac{(1 - z_1/z_2)\cos\left(\frac{2\omega h}{c_3}\right) + i(z_3/z_2 - z_1/z_3)\sin\left(\frac{2\omega h}{c_3}\right)}{(1 + z_1/z_2)\cos\left(\frac{2\omega h}{c_3}\right) + i(z_3/z_2 + z_1/z_3)\sin\left(\frac{2\omega h}{c_3}\right)} \quad (5a)$$

where $\omega$ is the angular frequency of the wave ($=2\pi f$) and subscript 3 corresponds to the thin layer)

A Trapped Thin Film

For the case when the intermediate layer between two solids is thin compared to the wavelength, equation (5a) can be simplified, and R depends on the stiffness, K, of the intermediate layer (see Schoenberg, 1980, J. Acoust. Soc. Am. 68, 1516).

$$R = \frac{(z_2 - z_1) + i\omega/K(z_1 z_2)}{(z_2 + z_1) + i\omega/K(z_1 z_2)} \quad (5b)$$

This complex reflection coefficient has both magnitude and phase, $\phi$, where both depend on the stiffness of the layer/film between the solids (see Reddyhoff et al, 2005, Proc IMechE J, 219, 387):

$$|R| = \sqrt{\frac{(\omega z_1 z_2)^2 + K^2(z_2 - z_1)^2}{(\omega z_1 z_2)^2 + K^2(z_2 + z_1)^2}} \text{ and } \phi = \tan^{-1}\frac{\frac{2\omega z_1 z_2^2}{K}}{(z_2^2 - z_1^2) + z_1^2 z_2^2\left(\frac{\omega}{K}\right)^2} \quad (6)$$

For a liquid layer, the stiffness is a function of its bulk modulus, B and the layer thickness, h according to:

$$K = \frac{B}{h} \quad (7)$$

And so:

$$h = \frac{\rho c^2}{\omega z_1 z_2}\sqrt{\frac{R^2(z_2 + z_1)^2 - (z_2 - z_1)^2}{1 - R^2}} \quad (8)$$

Thus, the film thickness can be determined from measurements of either R or $\phi$, or vice versa, if the bulk modulus is known (see Dwyer-Joyce et al, Proc Roy Soc A459, p. 957). Alternatively if the film thickness is known the bulk modulus of the liquid may be determined. The bulk modulus may then be used to determine the density and speed of sound in the liquid.

Shear Waves and Viscosity

Equations (1), (2), and (3) are true for either longitudinal or shear polarised ultrasound. However for shear polarised ultrasound the acoustic impedance of a solid and liquid are given by:

$$z_s = \rho_s c_s \text{ and } z_l = \sqrt{\rho_l i \omega \eta} \quad (9)$$

Note that equation (9) is true for a Newtonian fluid. Relationships are available for non-Newtonian fluids that involve the relaxation time of the liquid, and such relationships could be used in place of equation (9), where necessary/appropriate. Combining (9) with (3), where subscript s refers to the solid and subscript/refers to the liquid gives:

$$\eta = \frac{2\rho_s^2 c_s^2}{\omega \rho_l} \left(\frac{1-R}{1+R}\right)^2 \quad (10)$$

In this way the viscosity of the liquid may be determined from the shear wave reflection at the solid liquid boundary.

Formation of a Standing Wave

Figure 3:
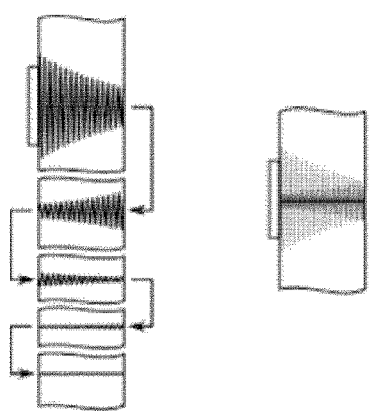
FIG. 3 illustrates the superposition of a series of reflected waves to form a superimposed standing wave.
Figure 3:
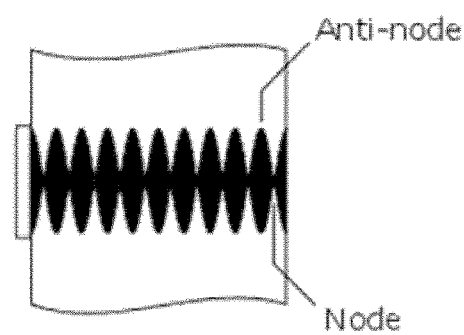

An ultrasonic wave propagates through the material until it reaches a boundary, at which point the wave is then reflected along the path of the incident wave (assuming the wave is normally incident on the boundary), returning to the source of the original wave where it will be reflected again. This process of successive reflection continues until the wave decays to zero amplitude. FIG. 3 shows a schematic diagram of a series of ultrasonic wave reflections. At each boundary the wave amplitude is reduced and (in the example illustrated) the phase changes; attenuation occurs inside the material, also reducing the wave amplitude. The successively reflecting waves will superimpose and set up a local standing wave within the material, also shown in FIG. 3.

The Effect of the Driving Wave Frequency

The amplitude spectrum, A(f) of the superimposed standing wave will be a function of the material properties of the component through which it propagates, its geometry and the driving frequency of the source. At a particular driving frequency, f, the wavelength will be such that the superposed waves will constructively interfere and the combined wave will have maximum amplitude. This occurs at a frequency referred to herein as the standing wave superposition frequency $f=f_s$. The value of $f_s$ is not unique of any particular system, since there will be multiple frequencies that will each produce a (local) maximum. The lowest value of $f_s$, (i.e. at n=1, where n is the mode number) is, assuming a simple geometry, when half the wavelength equals the length of the component ($\lambda=2L$), and so:

$$f_s = \frac{c}{2L} \quad (11)$$

Figure 4:
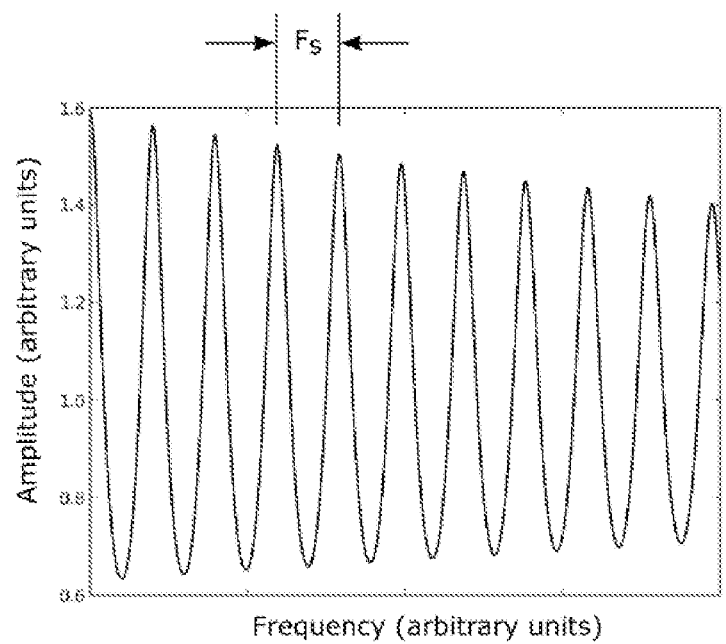
FIG. 4 illustrates the relationship between the driving frequency and the amplitude of the superimposed wave. At $f=nf_s$ maximum coherence occurs and the standing wave frequency is maximum.

If the frequency of the wave moves away from this frequency, $f \neq f_s$, the waves will be less coherent and the amplitude of the superimposed wave will reduce relative to the amplitude at $f=f_s$. At a frequency of $f=2f_s$ the waves will again be coherent and the amplitude will be at a maximum. FIG. 4 shows how the frequency of the ultrasonic wave and the amplitude of the superimposed reflections are related. The peaks of maximum amplitude occur at intervals of $f_s$.

Mathematical Description of Standing Wave Superposition

Figure 5:
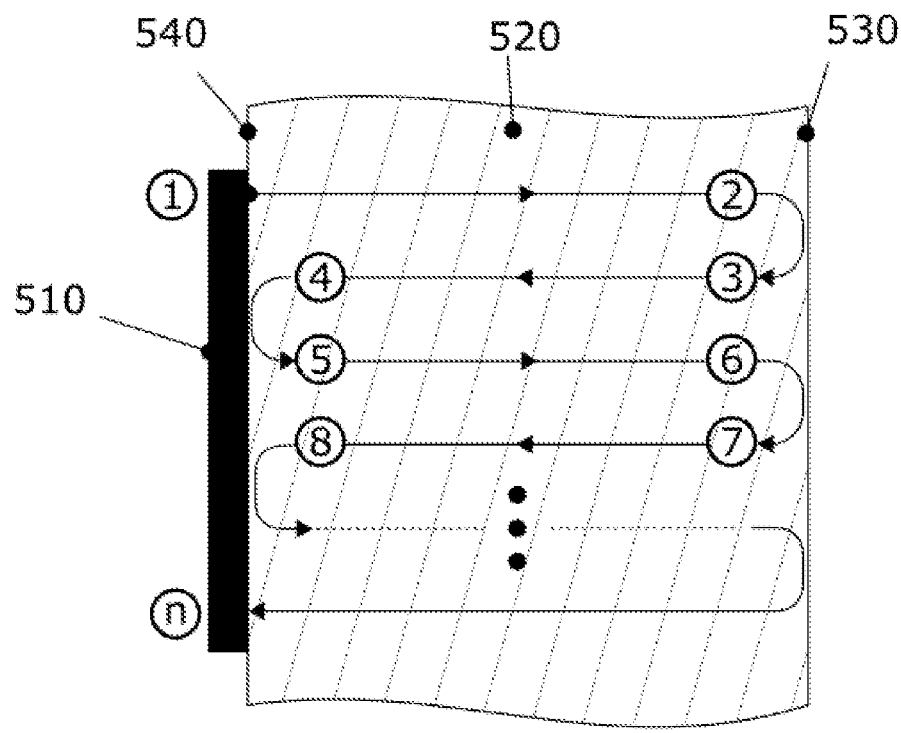
FIG. 5 illustrates locations of a wave as it is emitted from a transducer, propagates, attenuates, and reflects through a component.

FIG. 5 schematically shows numbered locations of a wave as it is emitted from the transducer 510, propagates, attenuates, and reflects through component 520. The waves reflect from surface 530 (surface 530 could alternatively be a boundary or interface, for example). Surface 530 which represents a free surface, may be a surface bearing a constrained or unconstrained layer, may be in contact with another (solid) element, or may represent a region in which the properties (e.g. acoustic impedance) of component 520 change. In any case, the ultrasound waves are reflected from surface/boundary 530 and also reflected from the surface 540 in contact with the transducer 510. The vertical displacement of the wave at each reflection in FIG. 5 is for clarity, so that subsequent passages of the wave through the material are not illustrated as overlapping the previous passages through component 520. Numbers in circles denote the progress of a particular portion of the wave through component 520, as described in more detail below.

At location 1 the wave has been emitted into the component 520 by the transducer 510. For the present example, the emitter function may be denoted by:

$$1. \; A_0 e^{i\omega t} \quad (12)$$

At location 2, just before the first reflection, the wave has been attenuated according to equation (1), where L and c are the distance travelled and speed of sound in the component 520, respectively. Thus, as location 2, the amplitude of the wave is given by:

$$2. \; A_0 e^{i\omega(\frac{L}{c}-t)} e^{L\alpha} \quad (13)$$

Immediately after the first reflection the amplitude is given by:

$$3. \; A_0 e^{i\omega(\frac{L}{c}-t)} e^{L\alpha} R e^{-i\phi} \quad (14)$$

where R' and ϕ' are the reflection coefficient and phase change respectively at the surface/boundary 530. This corresponds with the component of the incident wave that is reflected, where the incident wave is given by equation (13). The wave then passes back through the component 520 and immediately before the reflection at the transducer 510 location (surface 540) has an amplitude of:

$$4. \; A_0 e^{i\omega(\frac{2L}{c}-t)} e^{2L\alpha} R e^{-i\phi} \quad (15)$$

This corresponds with the wave of equation (14) with attenuation for a passage through the component 520. The amplitude immediately after the reflection at the interface between the component 520 and transducer 510 interface is given by:

$$5. \; A_0 e^{i\omega(\frac{2L}{c}-t)} e^{2L\alpha} R e^{-i\phi} R' e^{-i\phi'} \quad (16)$$

where R' and ϕ' are the reflection coefficient and phase change respectively at the transducer boundary 540.

This corresponds with the component of the incident wave that is reflected from surface 540, where the incident wave is given by equation (15). After another passage of the wave through the material to surface 530 and back to surface 540, inclusive of reflection at surface 430 and attenuation, the amplitude at location 8 is:

$$8. \; A_0 e^{i(\omega(\frac{4L}{c}-t)-2\phi-\phi')} e^{4L\alpha} R^2 R' \quad (17)$$

After n passages through the component (where a passage consists of travelling from the transducer 510 to the surface 530 and back again), the amplitude of the wave is:

$$n. \quad A_0 e^{i\left[\omega\left(\frac{2nL}{c}-t\right)-n\phi-(n-1)\phi'\right]} e^{2nL\alpha} R^n R'^{(n-1)} \quad (18)$$

The influence of reflection and phase change can be visualised using a spiral plot (FIG. 6) where successive reflection vectors are plotted on a polar grid with a cumulative phase shift. A greater a, smaller R and R' will lead to a rapidly decaying spiral. The measurement system is at its most sensitive (to measure R) when the transducer reflection, R' is close to unity and $\alpha$ is small.

FIG. 5 illustrates an arrangement in which there is a direct line of sight between the transducer 510 and the surface 530. Further, in the arrangement of FIG. 5, the transducer 510/surface 540 in contact with the transducer is parallel to the surface 530. This arrangement (or arrangements in which sufficiently approximate these conditions) allow for reduced complexity in molding the system, simplifying the analysis.

Figure 6A:
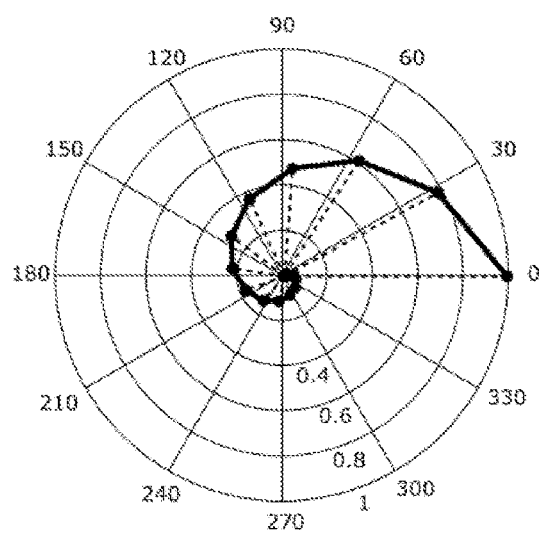
FIG. 6a illustrates reflection amplitude and phase represented on a polar plot for a reference measurement in which the surface of interest is a boundary between the component and air.
Figure 6B:
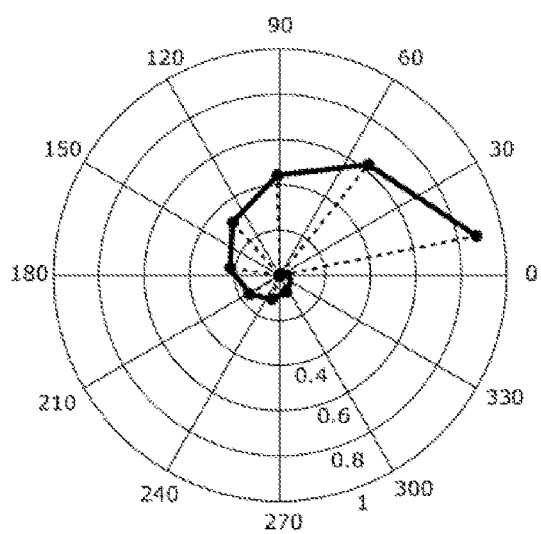
FIG. 6b illustrates reflection amplitude and phase represented on a polar plot for a measurement where there is a medium at the surface of interest.

FIG. 6a illustrates reflection amplitude and phase represented on a polar plot for a reference measurement in which the surface of interest 530 is a boundary between the component and air. FIG. 6b illustrates reflection amplitude and phase represented on a polar plot for a measurement where there is a medium at the surface of interest 530, in this case the signal decays more rapidly (than that in FIG. 6a) as energy is transmitted into the medium. The medium may be a layer, coating, film, etc. and these terms are used interchangeably herein.

Note that equations (12) to (16) merely describe a particular component of the wave, and do not take into account the effect of interference by portions of the wave emitted by the transducer 510 at different times and travelling through the component 520. All the reflected waves located at the transducer of FIG. 5 superimpose, so the wave amplitude detected at the transducer is then the sum of (15), (17), and (18):

$$A_R = A_0 \sum_{n=1}^{\infty} e^{i\left[\omega\left(\frac{2nL}{c}-t\right)-n\phi-(n-1)\phi'\right]} R^n R'^{(n-1)} e^{2nL\alpha} \quad (19)$$

In the case where the reflection is between a component and air, then R=1 and $\phi$=0 and the amplitude is given by:

$$A_I = A_0 \sum_{n=1}^{\infty} e^{i\left[\omega\left(\frac{2nL}{c}-t\right)-(n-1)\phi'\right]} R'^{(n-1)} e^{2nL\alpha} \quad (20)$$

This arrangement (in which the surface of interest 530 is a boundary between the component 520 and air) may be used as a reference arrangement. Other reference arrangements are possible (such as a known starting condition of a system, for example).

If we denote the superimposed standing wave reflection coefficient, S as the proportion of the superimposed incident wave that is reflected back to the transducer relative to the reference arrangement of equation (20), then S(t) is given by a ratio of equations (19) and (20):

$$S(t) = \frac{\sum_{n=1}^{\infty} e^{i\left[\omega\left(\frac{2nL}{c}-t\right)-n\phi-(n-1)\phi'\right]} R^n R'^{(n-1)} e^{2nL\alpha}}{\sum_{n=1}^{\infty} e^{i\left[\omega\left(\frac{2nL}{c}-t\right)-(n-1)\phi'\right]} R'^{(n-1)} e^{2nL\alpha}} \quad (21)$$

S is periodic with time. Taking the signal root mean square (RMS) provides the DC response of the system. This may be implemented practically by a rectification and smoothing process, for example.

$$S(t) = \frac{\sum_{n=1}^{\infty} e^{i\left[\omega\left(\frac{2nL}{c}\right)-n\phi-(n-1)\phi'\right]} R^n R'^{(n-1)} e^{2nL\alpha}}{\sum_{n=1}^{\infty} e^{i\left[\omega\left(\frac{2nL}{c}\right)-(n-1)\phi'\right]} R'^{(n-1)} e^{2nL\alpha}} \quad (22)$$

If S is measured, e.g. by measuring the amplitude at the transducer in a reference state and a state of interest (also referred to herein as a measurement state) and taking a ratio, and knowing the parameters, R', $\phi'$, L, and $\alpha$, then R may be found using equation (22). Depending on the nature of the surface medium, R may be substituted from equation (5a/b), (8) or (10) to find the surface medium properties.

Practical Generation of a Superimposed Standing Wave

Driving Frequency Sweep

Figure 7:
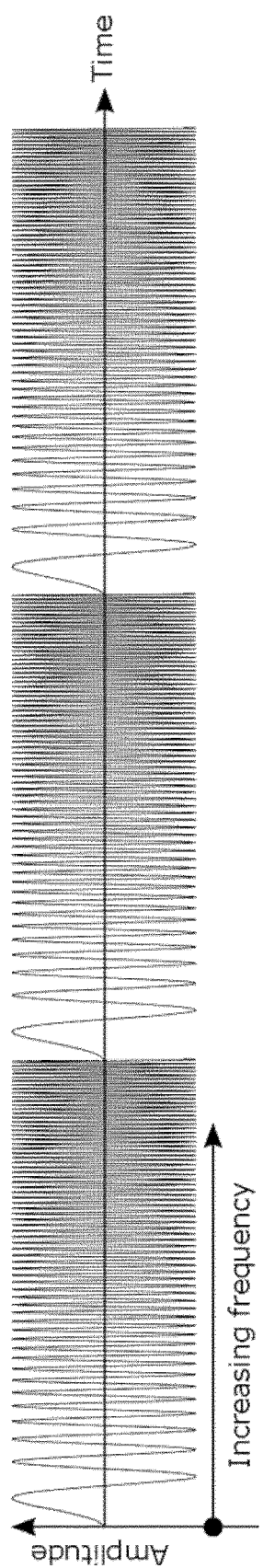
FIG. 7 illustrates an ideal frequency sweep to be applied as the driving frequency.

For any given component and layer system the driving frequency that causes the maximum amplitude superimposed standing wave is not necessarily known in advance. According to some examples, the transducer is driven so as to sweep through a series of frequencies and record the response for all those frequencies. Accordingly, driving frequencies that produce a maximum measured amplitude may be determined in a convenient manner. FIG. 7 schematically shows an ideal input frequency sweep. Once completed, the sweep may repeated continuously (three such sweeps are shown in the figure). Other sweeping schemes are possible, such as a scheme in which the frequency is increased in one sweep and decreased in the following sweep.

In some examples, each frequency sweep is identical. However, in some examples successive frequency sweeps may differ from each other, for example by being over different ranges, having different frequency increments, and/or a different rate of change of frequency, for example. For example, a driving frequency sweep is applied to determine the standing wave maximum frequencies (i.e. frequencies at which the amplitude of the standing wave is locally maximal in the frequency domain); however, once it is known that those frequencies occur within a particular range or bandwidth, a more closely defined sweep (or series of driving frequencies) might be used.

In some examples the frequency sweep may include discontinuous subranges of frequencies. For example, where the frequencies of a plurality of standing wave maxima are known, the frequency sweep may include frequencies only at/around each of these maxima, omitting frequencies at/around minima of the superimposed standing wave.

Transducer Response

Figure 8:
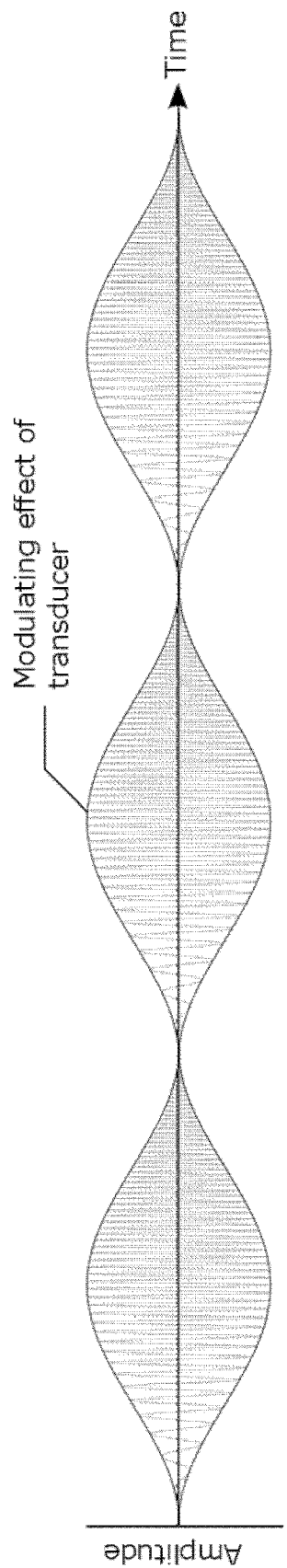
FIG. 8 illustrates a driving frequency sweep transmitted into the substrate, in which the ideal signal of FIG. 7 is attenuated by the real transducer response function.

Real piezoelectric transducers have a finite bandwidth and so do not generate or receive the full range of frequencies in the manner shown in FIG. 7. FIG. 8 schematically shows a typical transducer response function or envelope for the three frequency sweeps of FIG. 7. The lower and higher frequencies of each sweep are generated at substantially reduced amplitudes.

Formation of the Superimposed Standing Wave

Figure 9:
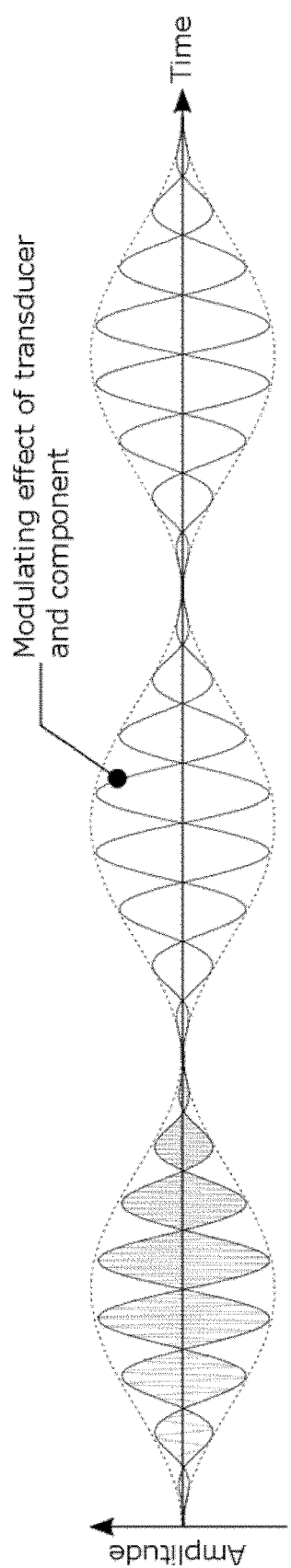
FIG. 9 is a schematic diagram of the response of a component to the input function of FIG. 8. The response consists of the superposition of all the internally reflected waves within that response window.

The driving frequency sweep of FIG. 8 superimposes with all its reflections and sub-reflections, as described above with reference to FIG. 5, to create the superimposed standing wave shown schematically in FIG. 9. At some points in time (i.e. corresponding to a specific driving frequency) the received signal is at a maximum as constructive interference occurs. At other times, the amplitude is minimum, corresponding to destructive interference. Essentially, the component itself has a modulating effect on the input frequencies.

In FIG. 9 the constituent wave amplitudes are shown only in the first sweep, for clarity. Only the envelope of the peaks is shown in the second and third sweeps. In practice, rather than using the peak envelope it is more convenient to use the RMS of the signal. And since every time corresponds to a driving frequency (since the driving frequency is swept in time), the RMS of the signal may be plotted against the driving frequency. This is shown schematically in FIG. 10.

The RMS amplitude of this superimposed standing wave (with respect to frequency) may be used to derive properties of the surface of interest. The pitch of the maxima in the RMS signal is the standing wave superposition frequency, $f_s$.

Effect of a Medium at the Surface

Figure 11A:
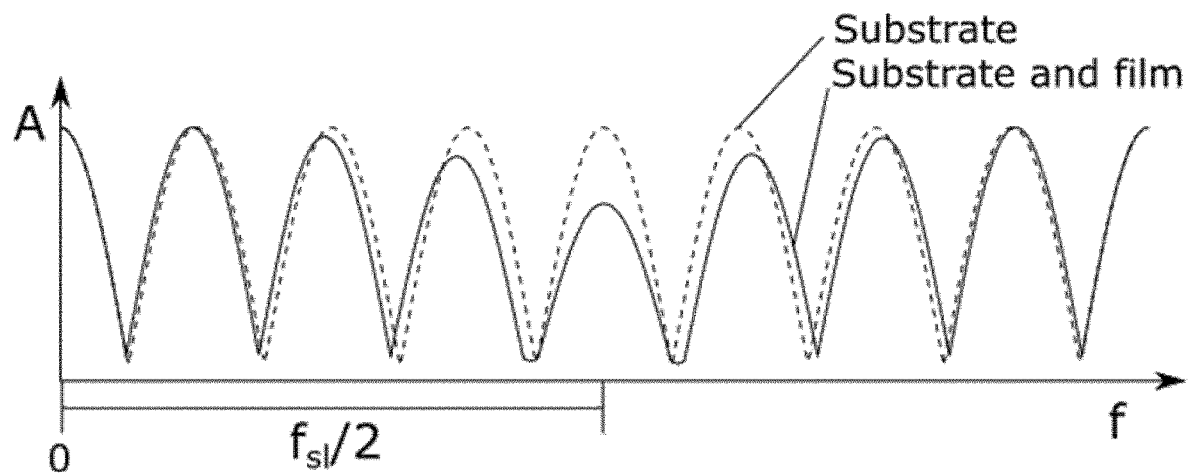
FIGS. 11a and 11b schematically illustrate changes in measured response due to the addition of a surface layer.
Figure 11B:
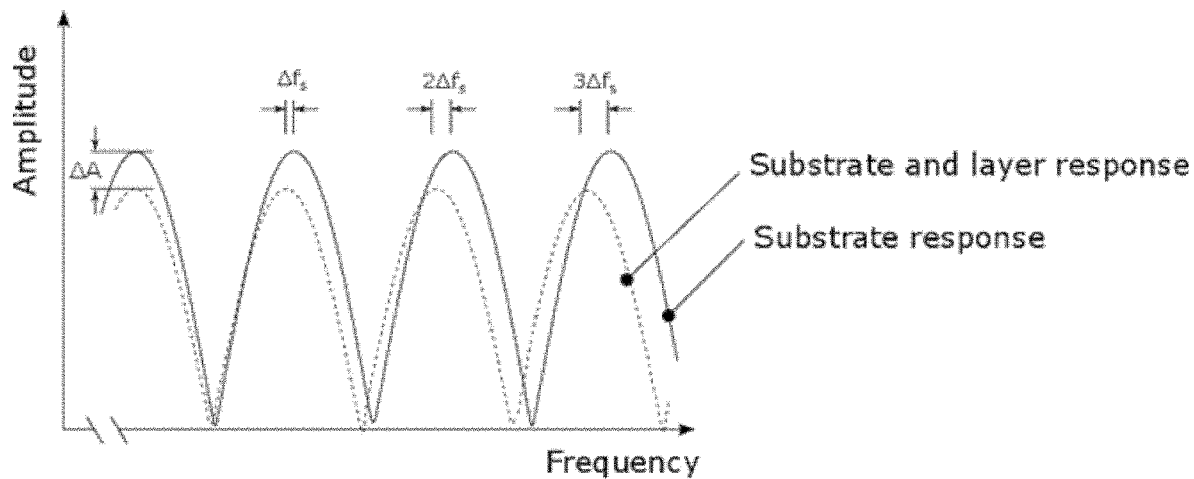

The addition of a surface layer to the surface of interest of the component causes the reflection coefficient at the interface, R to reduce and the phase $\phi$ to change relative to a reference state with air at the surface of interest. If the layer is thick then it will also have resonant frequencies, $f_{sl}$ that superimpose on those in the component. The state of the component that is to be measured (in this case, the state in which the surface layer has been added) is referred to herein as the state of interest. This change in R and $\phi$ changes the coherent frequency at which a superimposed standing wave forms. Accordingly, the superposed standing wave in the state of interest is changed, relative to the reference state, in amplitude and in the frequency, $f_s$, at which the maximum amplitude occurs. FIG. 11a shows the RMS standing wave pattern before and after the layer is added (i.e. in the reference state and state of interest). The layer causes the amplitude and frequency to reduce and also a further resonance is superimposed. A FIG. 11b shows the same figure zoomed in around the low frequency regime. For very thin layers the resonant frequency of the layer $f_{sl}$ may be outside the transducer bandwidth and so not observed in the spectrum. The spectrum would then resemble FIG. 11b throughout the bandwidth. FIG. 11b illustrates an example in which the amplitude of the standing wave is reduced by $\Delta A$ and the location of the maximum amplitude frequency is reduced by an amount $\Delta f_s$.

Reduction in Amplitude

Equation (22) describes the ratio of the amplitude of the superimposed standing wave for the measurement case divided by the reference case. As such, a ratio of the two RMS signals shown in FIG. 11 gives the standing wave reflection coefficient, S. Once S has been obtained, equation (22) may be used obtain R for the solid-liquid interface. In principle, S may be used at any of the measurement frequencies (and that frequency may be used in equation (22)). However, in practice the best signal to noise is obtained at frequencies around the maximum amplitude points, $nf_s$. Once R is obtained this can be used in the relationships (5a/b), (8) or (10) to determine the properties of the liquid or thin liquid layer.

Change in Frequency

The presence of the layer, provided it is thick enough to cause resonance within the bandwidth frequencies, will superimpose those resonances onto the signal ($f_{sl}$ on FIG. 11a). The thickness of the layer can be obtained directly from this resonance frequency and the speed of sound in the layer material.

The component, the surface medium, and the bonded transducer (if present) behave as a composite system (i.e. response of the layer combines to give total system response and hence, peak positions). When there is no surface medium present the equivalent speed of sound through the component (path length, L) and the transducer (path length, l) combined is:

$$\frac{Lc + lc_t}{L + l} \qquad (23)$$

where c is the wave speed in the component, and $c_t$ is the wave speed in the transducer material. The assembly first resonates (n=1) when the wavelength $\lambda=2(L+l)$ and so the location of the peak frequency is at:

$$f_s = \frac{(Lc + lc_t)}{2(L + l)^2} \qquad (24)$$

When there is a surface medium present the equivalent speed of sound through the component, transducer, and surface layer combined is:

$$\frac{Lc + lc_t + hc_l}{L + l + h} \qquad (25)$$

where h is the path length in the surface layer and $c_l$ is the wave speed in the surface medium material. The peak frequency is then increased above $f_s$ by an amount $\Delta f_s$:

$$f_s + \Delta f_s = \frac{Lc + lc_t + hc_l}{2(L + l + h)^2} \qquad (26)$$

$\Delta f_s$ may have a negative value, as in FIG. 11, for example.

Combining equations (24) and (26) gives the change in the peak frequency as:

$$\Delta f_s = \frac{Lc + lc_t + hc_l}{2(L + l + h)^2} - \frac{(Lc + lc_t)}{2(L + l)^2} \qquad (27)$$

The layer thickness, h, may be determined by solving the quadratic equation (27).

Higher Order Resonances

Figure 12:
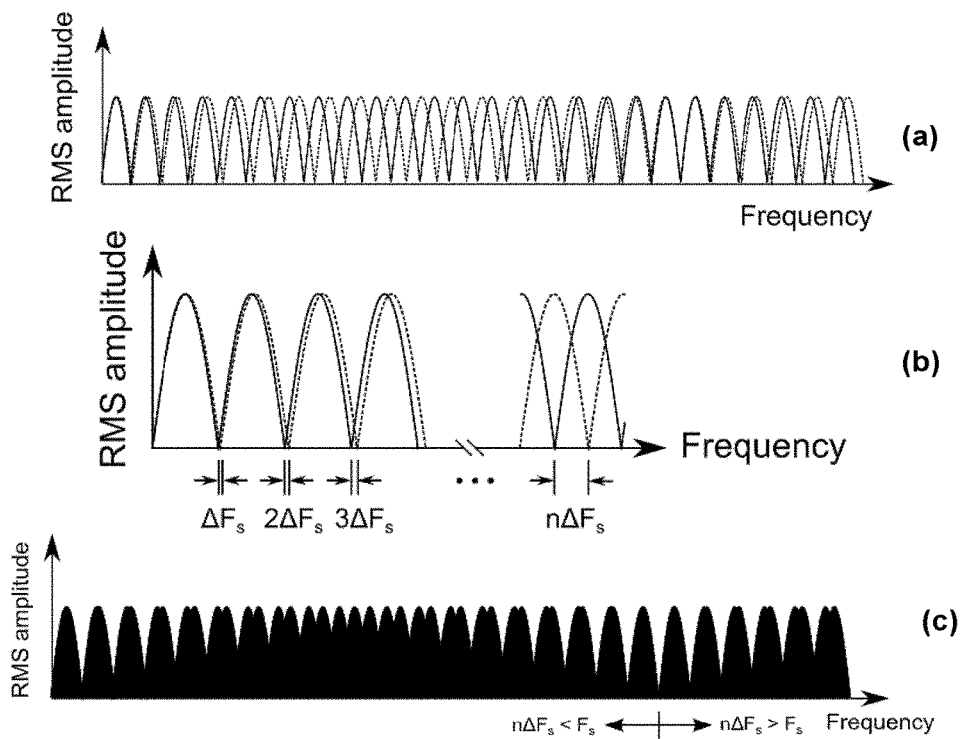
FIG. 12 schematically illustrates the change in resonant frequency due to an increase in the wave path length.

If the wave amplitudes from the reference (without a surface layer/medium) and coated component (with a surface layer/medium) are compared then an interference pattern is created (as shown in FIG. 12). The first order peaks are separated by $\Delta f_s$, the second order by $2\Delta f_s$, and the nth order by $n\Delta f_s$. As the resonant order, n increases the separation increases until the peaks are back in phase when $n\Delta f_s = f_s$.

Measuring the change in resonant frequency at a higher order harmonic, $n\Delta f_s$ provides a very accurate way of measuring $\Delta f_s$ and hence for deriving the layer thickness using equation (27). The higher the harmonic order, n the larger the value of $n\Delta fs$ and hence the more accurately $\Delta f_s$ can be determined. Eventually the separation is $n\Delta f_s = f_s$ and the peaks are back in phase again.

If the standing wave amplitude spectrum for the measurement state is superimposed over the spectrum for the reference state an interference pattern is produced (as shown in FIG. 12c). Determination of the peaks and valleys in this interference pattern is another accurate way to determine the change in resonant frequency $f_s$.

Apparatus

Figure 13:
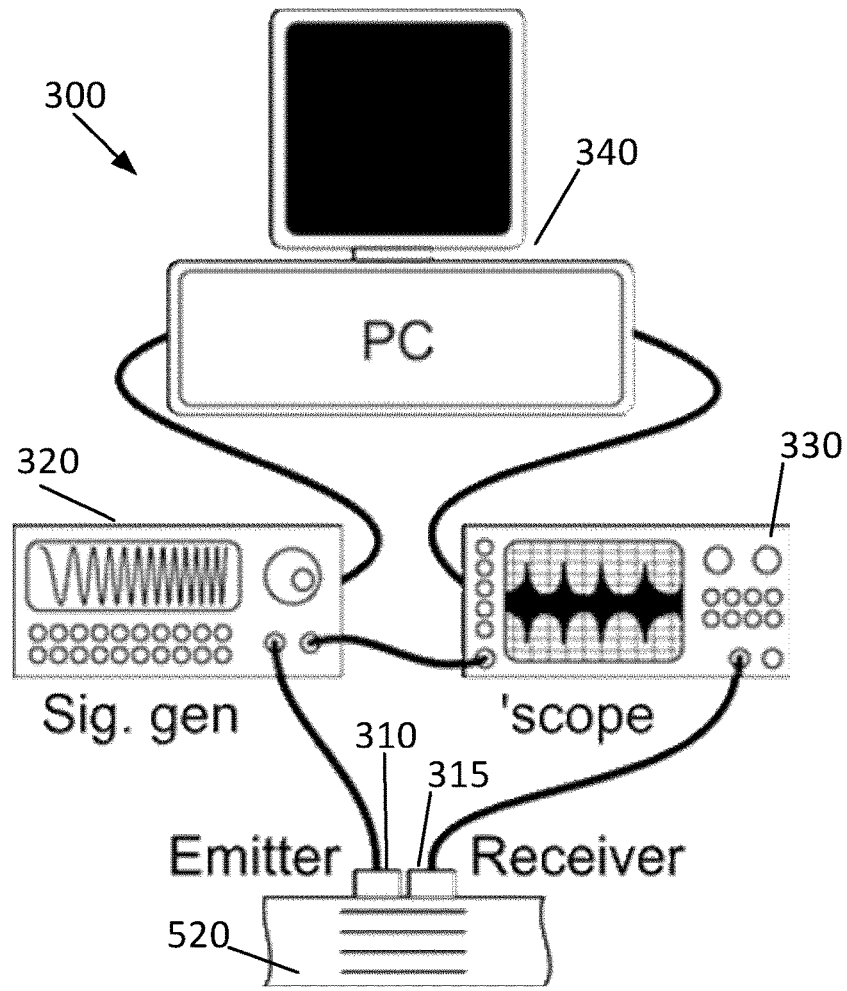
FIG. 13 schematically illustrates the components of an exemplary measurement apparatus.

An exemplary apparatus 300 suitable for use in some examples may include four subsystems, as shown in FIG. 13. The four subsystems are:
  (i) A pair of transmitting 310 and receiving 315 transducers may be coupled to a back face of the component 520, where the back face is a face other than the surface of interest. According to some examples the piezoelectric transducers 310, 315 may be designed/arranged to operate in the 1-50 MHz frequency range.
  (ii) A signal generator 320 may be arranged to provide a sinusoidal varying voltage at a tuneable range of frequencies. Typically driving voltages in the order of ±5V are used. The varying voltage is provided to the transmitting transducer 310 (emitter) to drive the transmitting transducer 310. The varying voltage may also be provided to a digitizer 330. The signal generator may be controlled by a PC 340. In some examples, the PC 340 may receive information from the signal generator indicative of the varying voltage provided to the transmitting transducer 310.
  (iii) Digitizer 330 (illustrated in FIG. 13 as a digital oscilloscope) may be arranged to receive a signal from the receiving transducer 315, and may record the waveform and/or pass it to PC 340 for processing.
  (iv) PC 340 may be used for data storage and/or processing. In some examples the PC 340 may be used to control the signal generator 320 and/or digitizer 330. Any suitable computing device may be used in place of the PC.

The transmitting transducer 310 may be excited with a sinusoidal varying voltage that can be varied on command. The transducer converts this voltage to a continuous mechanical wave that propagates and reflects through the component 520. The wave arriving at the receiving transducer 315 is converted to an analogue voltage signal. This signal is captured, digitized by the digitizer 330, and passed to the PC 340 for processing.

According to some examples, the apparatus of FIG. 13 may be realised using standard off the shelf instrumentation, such as an arbitrary function generator, a digital oscilloscope, and a conventional PC. Alternatively, in some examples, off-the-shelf integrated circuits (IC's) may be used to perform the key functions.

The type of transducer 310 used to generate a mechanical wave in the component 520 is not particularly limited. The type of transducer (its topology, polarisation, frequency, and geometry) may be selected to match the interface effect to be measured. By way of example, the following is a non-exclusive list of possible transducer types:
  1. A longitudinally polarised piezoelectric element. A frequency rage of 1-50 MHz may be used to measure the thickness of a surface layer, or the thickness of a trapped liquid film.
  2. A shear polarised piezoelectric element. A frequency range 1-50 MHz may be used to measure the viscosity of an adjacent liquid or of a liquid surface layer.
  3. Non-contact driving may be achieved using an Electromagnetic Acoustic Transducer (EMAT).
  4. A sputtered piezoelectric film may be used as the transmitter and receiver.

According to some examples the emitter and receiver may be separate elements (e.g. different transducers or a split transducer (i.e. the emitter and receiver are discrete components). In some examples the emitter and receiver may be implemented using a single transducer. However, when the emitter and receiver are separate, the measured data is more easily extracted from the driving signal for the emitter.

Figure 14:
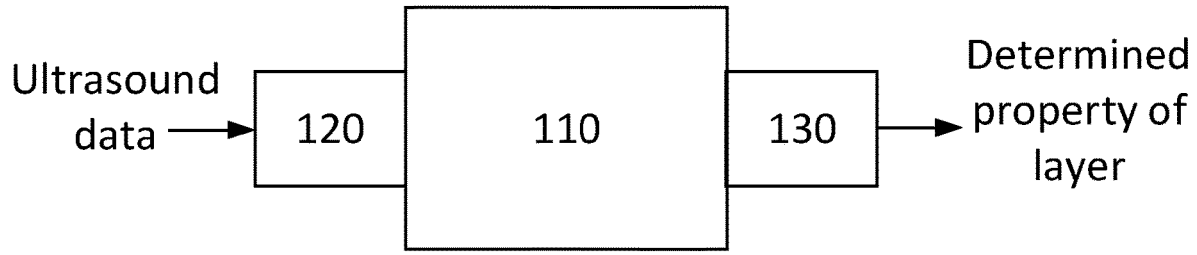
FIG. 14 schematically illustrates a device according to some examples.

FIG. 14 illustrates a device 100 according to some examples. The device includes a processing section 110, suitable for carrying out processing operations.

The processing section 110 may be arranged to receive, via an input 120, ultrasound data relating to continuous wave, swept frequency ultrasound propagated through the component. The processing section 110 may be arranged to derive a standing wave amplitude spectrum from the received ultrasound data, and determine a property of an unconstrained layer on the surface based on the standing wave amplitude spectrum. The processing section 110 may be further arranged to output the determined property of the layer via output 130.

The device of FIG. 14 may be, or may be included in, the PC of FIG. 13.

The processing section may be arranged to derive the standing wave amplitude spectrum and determine a property of the unconstrained layer in accordance with the techniques described herein.

Herein an unconstrained layer is a layer having a free surface (e.g. in contact with a gas). Accordingly, the layer illustrated in FIG. 2c is not an unconstrained layer, since both of its (major) surfaces are in contact with a solid component.

The ultrasound data may relate to a measurement state of the component 520, i.e. a state of interest of the component.

The input 120 and output 130 may be, for example physical ports, wiring for carrying data (e.g. electrical leads, data busses, etc.), registers or memory for storing data, etc.

Method

The transmitting element 310 may be excited with a frequency sweep of 100 ms duration, for example. The frequency sweep may be a sequence of increasing frequencies that are generated and then repeated every 100 ms, for example. The RMS of the signal at the receiving element 315 is monitored and the superimposed standing wave pattern is recorded.

Initially, when there is no surface layer or other element in contact with the component a reference measurement is recorded; in this arrangement there is negligible transmission into the air. This is the reference measurement as given by equation (20). Alternatively, other arrangements could be used as a reference state. For example, any arrangement having negligible transmission at the surface of interest, e.g. where the surface of interest is in contact with vacuum or a gas other than air. Arrangements in which there is non-negligible transmission at the surface of interest may also be used if the parameters (such as the reflection coefficient and phase shift at the surface of interest in the reference state) are known. Use of an arrangement having negligible transmission at the surface of interest may reduce complexity relative to an arrangement having non-negligible transmission at the surface of interest.

When the component 520 is in the state of interest (e.g. when a surface layer has been applied) a superimposed standing wave is formed that is different from the superimposed standing wave in the reference state (assuming the state of interest is different form the reference state). The superimposed standing wave in the state of interest is given by equation (19). The RMS of this new signal may be recorded.

According to some examples, the measurement signal from the state of interest (e.g. having a layer on the surface of interest) is divided by that from the reference measurement to evaluate S. According to some examples S may be evaluated at a particular frequency and equation (22) may be used to evaluate R. In principle, any frequency can be used to evaluate R in this manner, and essentially the same layer properties should be derived. However, where the frequency used is at or around the standing wave maxima $nf_s$ the signal to noise ratio is expected to be at its highest, and so more accurate results are to expected compared with a frequency away from the standing wave maxima. In some examples, S may be derived at a plurality of frequencies and may be used together to derive a value of R; for example by determining respective values of R for each of the frequencies and obtaining a single value of R based on the values determined for the different frequencies (e.g. by averaging).

In some examples, S may be evaluated at a plurality of frequencies (e.g. at each frequency within the sweep, within the accuracy of the transmitting and/or measuring equipment) in order to evaluate S(f). Equation (22) may then be used to find R, for example by performing a fit of equation (22) to the evaluated S(f) using a plot fitting or optimization technique. For example, one or more of the parameters of equation (22) may be allowed to vary and an optimization process may be performed to minimize the RMS error between S(f) based on the measured data and S(f) according to equation (22).

When R has been determined, it may be used to find the properties of the surface medium using equations (8) or (10).

According to some examples, $\Delta f_s$ may be determined based on the change in the frequency of the standing wave maxima compared to the reference signal. This value of $\Delta f_s$ may be used in equation (27) to determine the thickness of the surface layer.

The spacing between any two corresponding superimposed standing wave maxima (one corresponding to the reference state and one corresponding to the state of interest) may be used to deduce $f_s$, provided that the order n is known. However, the higher the wave number, n, the larger that spacing $n\Delta f_s$ is.

Figure 15:
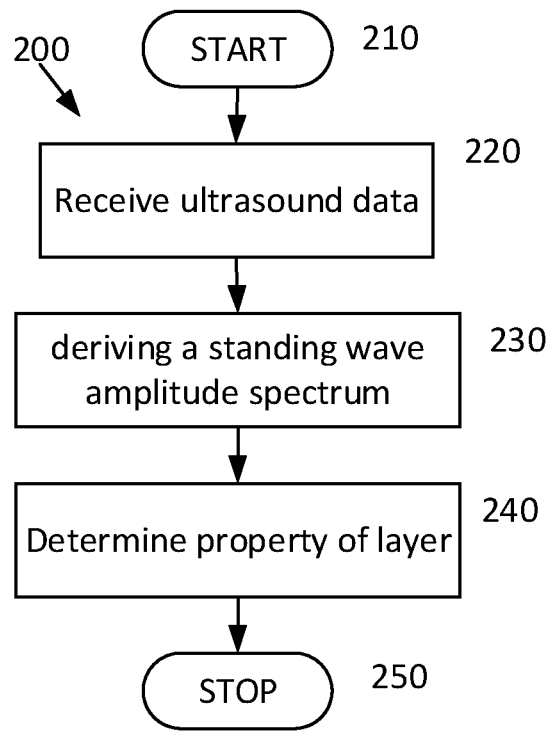
FIG. 15 illustrates a method according to some examples.

FIG. 15 illustrates a method 200 according to some examples. The method begins at 210, and at 220 ultrasound data is received, the date relating to continuous wave, swept frequency ultrasound that has propagated through the component. At 230 a standing wave amplitude spectrum is derived from the received ultrasound data. This may be performed in accordance with the preceding description, for example. At 240 a property of an unconstrained layer on the surface is determined based on the standing wave amplitude spectrum. This may be performed in a manner consistent with the previous description. For example, one or more of equations (8), (10), (22) and/or (27) may be used.

CONCLUSION

According to some examples, a continuous wave is generated in a component 520. The wave propagates, reflects, and attenuates inside the component 520. The reflections superimpose to create a 'superimposed standing wave'.

The amplitude and frequency spectra of the superimposed standing wave are highly sensitive to the presence and properties of the surface (e.g. surface of interest) of the component 520, such as the properties of a medium at the surface. The ratio of the amplitude reflected from the surface (e.g. reflected by a medium) to that in a reference state (e.g. when there is no medium present) is referred to herein as the standing wave reflection coefficient, S. A mathematical description of the superimposed standing wave can be used along with the value of the superimposed standing wave derived from measurement to find the reflection coefficient at the surface of interest (e.g. the surface/medium interface.)

Exemplary applications of some examples are measurement of: surface layers (such as paint thickness), viscosity of a thin layer; thickness and properties of a thin surface film. Some examples may have one or more of increased sensitivity, lower response time, and/or low cost instrumentation when compared with conventional pulse-echo type ultrasonic techniques.

References herein to particular implementations of hardware, such as the use of transducers, are not particularly limiting and any suitable hardware may be used to implement the various examples.

According to some examples, devices described herein, or elements thereof may include, for example, one or more processors, a personal computer, an Application Specific Integrated Circuit (ASIC), and/or memory. The devices or elements may be arranged to execute software and/or firmware instructions. For example, processing section 110 may be embodied in this manner.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect or example of the invention are to be understood to be applicable to any other aspect or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Nomenclature

A Amplitude of the recorded signal
$A_O$ Amplitude of driving signal emitted by the transducer
$A_I$ Amplitude of a wave incident at a boundary
$A_R$ Amplitude of a wave reflected at a boundary
c Speed of sound in the component 520
$c_{equiv}$ Equivalent speed of sound for a layered body $c_{pzt}$ Speed of sound in the piezoelectric transducer
f Frequency of the ultrasonic wave
$f_s$ Frequency at which the superimposed standing wave amplitude is maximum
h Surface medium layer thickness
K Stiffness of the interface
L Component thickness
l Transducer thickness
n Number of passages of the wave through the component
n Wave mode number
R Reflection coefficient at the interface of interest
R' Reflection coefficient at transducer face
S Ratio of the superimposed standing wave amplitude from a component with surface medium present, divided by that in the reference state without a surface medum.
t Time
z Acoustic impedance of the material (product of the wave speed, c and the density ρ)
α Attenuation coefficient of component material
ϕ Phase shift at interface of interest
ϕ' Phase shift at the transducer face
ω Angular frequency of the wave (=2πf)
λ Wavelength Case Study—Paint Film Thickness Measurements According to some examples, the thickness of multiple layers of paint sprayed onto a metallic surface may be accurately measured. The measurement of paint may be performed non-invasively from the counter face (back face) of the component as the paint is deposited. Metals used for cases of engineering components, for example, may consist of thin metallic shells of aluminium alloys, titanium alloys and steels, e.g. between 1.5-0.9 mm thick. Paints and coatings used to protect metallic surfaces from environmental affects may consist of an organic base with pigments and fillers.

Figure 16:
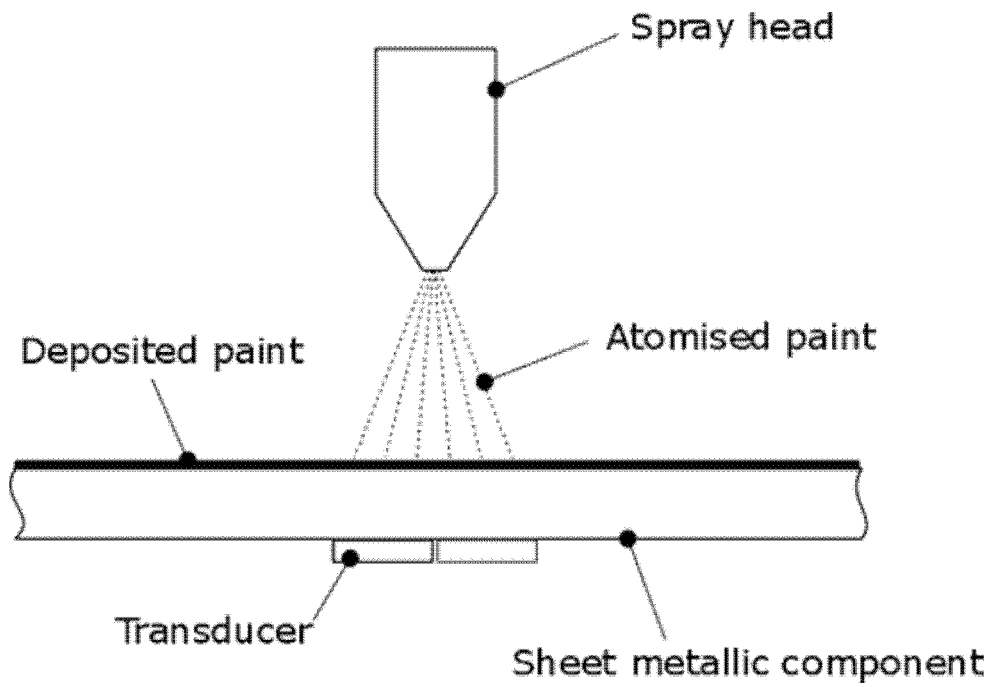
FIG. 16 schematically illustrates paint spraying and instrumented sample.

Piezoelectric transducers were bonded to the back face of a piece of aluminium (0.96 mm thick). Acrylic paint was sprayed onto the sample in approximately 10 µm layers and the change in the standing wave maximum frequency after each layer had cured was used to determine the paint thickness. Each paint layer thickness was measured using a profilometer for verification of the ultrasound results. FIG. 16 schematically illustrates the arrangement.

Figure 10:
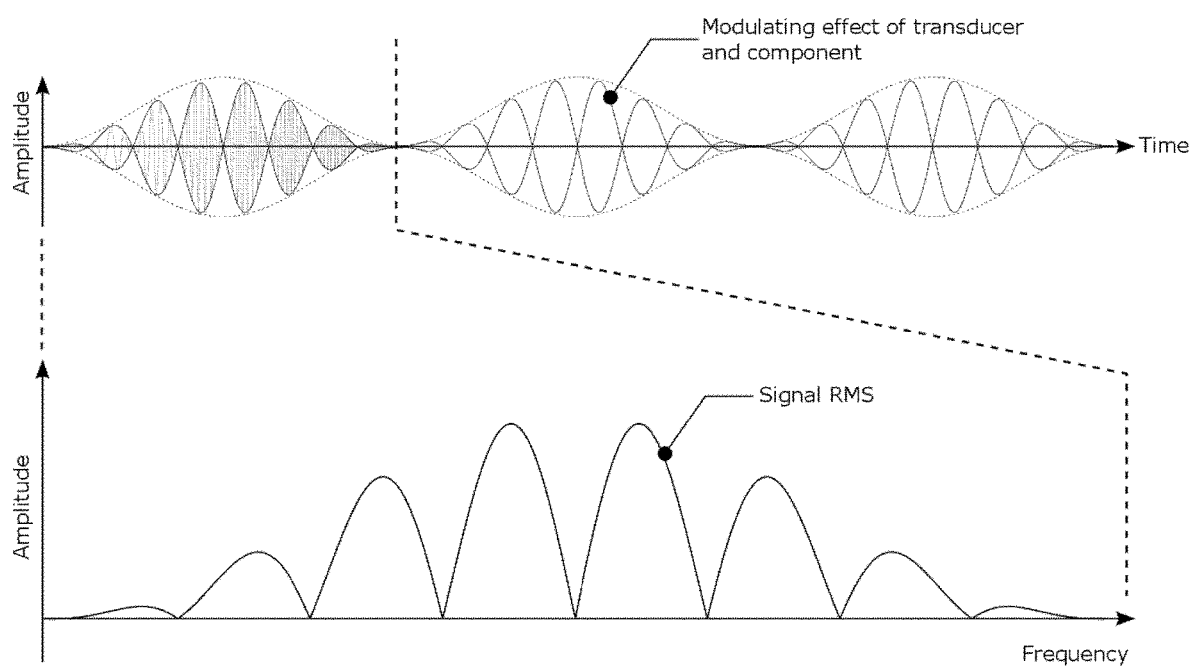
FIG. 10 is a schematic diagram of the superimposed standing wave root mean square (RMS) amplitude spectrum.
Figure 17:
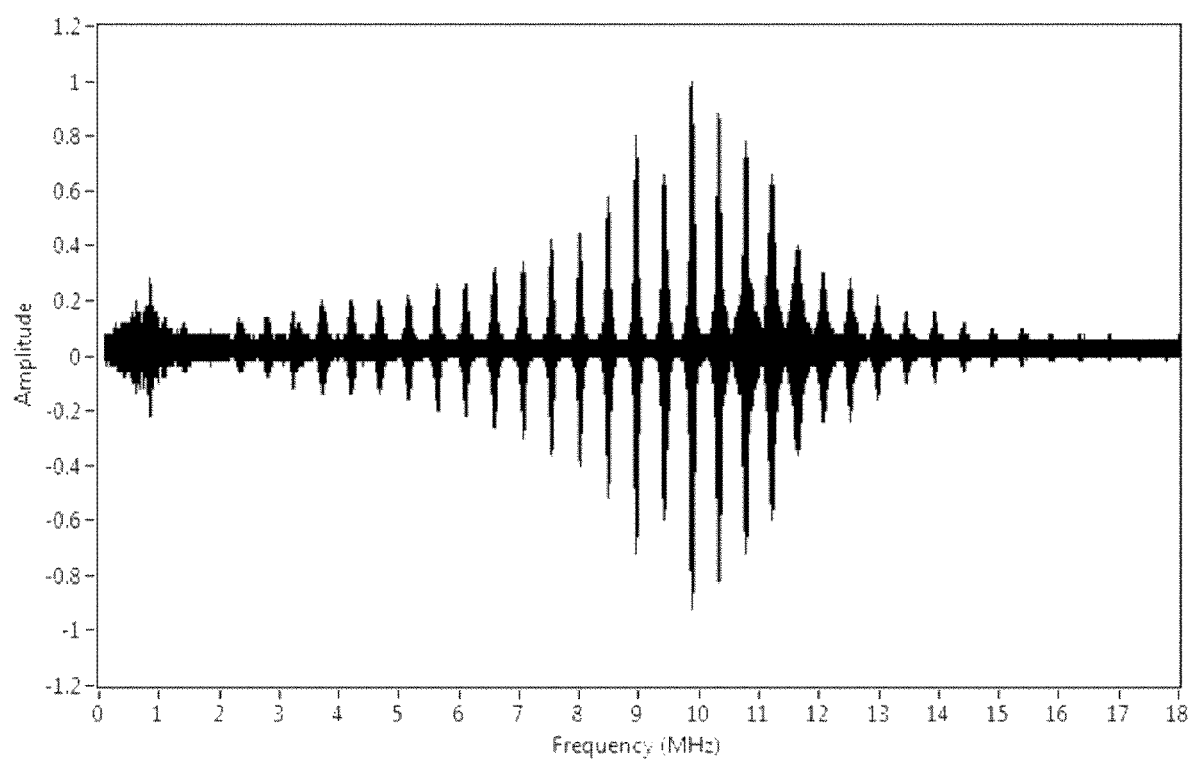
FIG. 17 illustrates a measured standing wave amplitude spectrum

FIG. 17 shows the standing wave amplitude spectrum measured from this system; this is the experimentally measured equivalent of the schematic FIG. 10. A clear spacing of standing wave peaks is observed.

Figure 18:
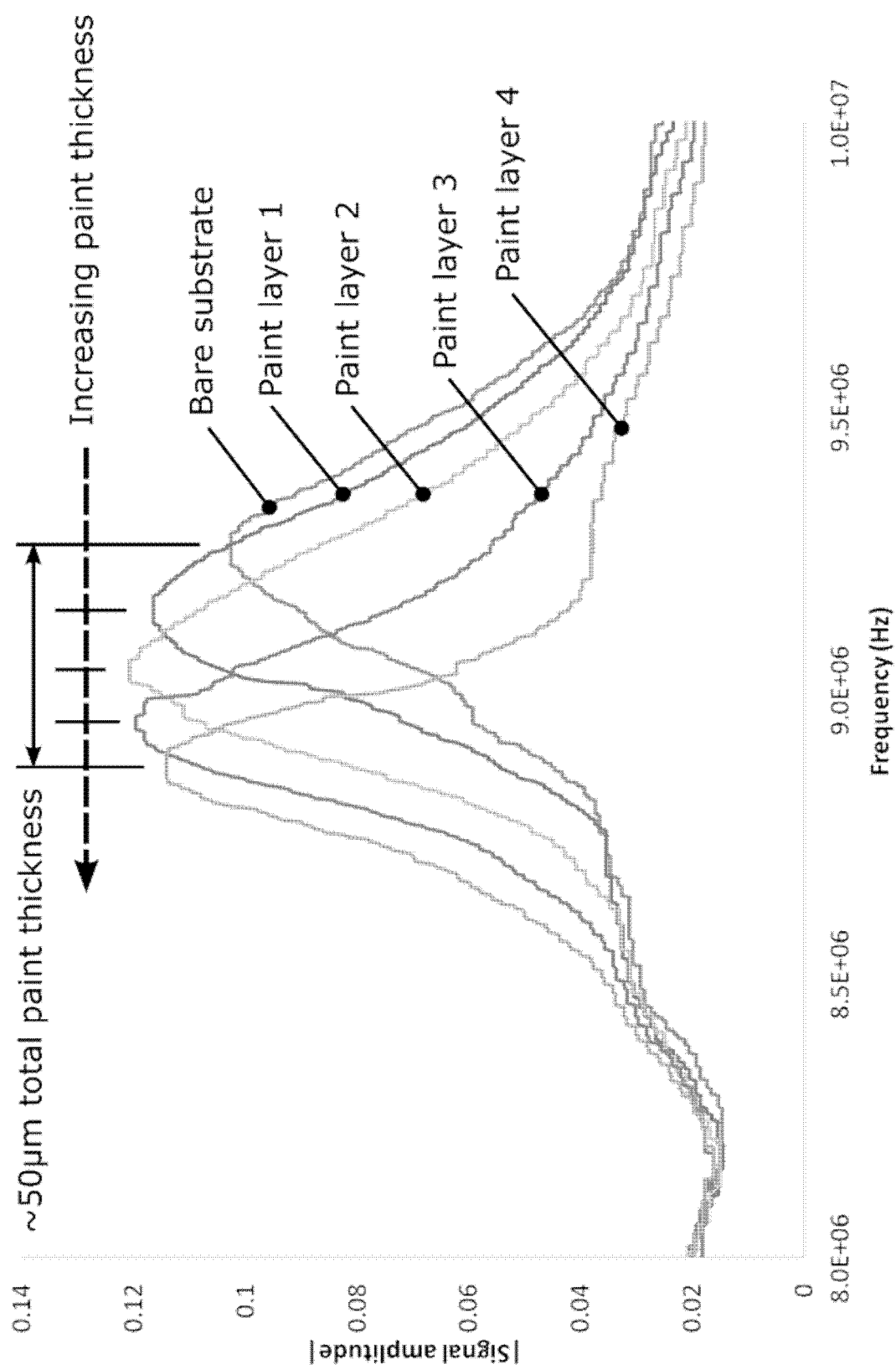
FIG. 18 illustrates acquisition response to subsequent layers of paint after drying.

FIG. 18 shows one such peak extracted from this data set, with measurements acquired as layers of paint are applied. With each additional layer the shift of peak frequency occurs as described above in relation to FIG. 11. After the application of a paint layer, the location of the standing wave peaks move to the left as a result of the systems additional thickness.

Values for $\Delta f_s$ were determined from the data in FIG. 18 for each of the paint layer thicknesses and compared with the physically measured results (using the profilometer after the addition of 4 approximately equal layers; the profilometer is accurate to 10 µm). Table 1 shows the results, and good agreement is observed.

TABLE 1

Paint thickness results

| Paint layer number | Change in $f_s$ (MHz) | Profilometer measurement (µm) | Ultrasonic measurement (µm) |
|---|---|---|---|
| 1 | 2.61 | 10 | 10.95 |
| 2 | 2.56 | 20 | 22.18 |
| 3 | 2.54 | 30 | 30.80 |
| 4 | 2.51 | 40 | 39.60 |

According to some examples thickness measurement accuracies may yield precision to 100's of nm.

Case Study—Viscosity Measurement of Liquid Layer

This case study describes measurement of the viscosity of Newtonian oil at the surface of a metal component from the back face. The method is able to measure the viscosity of fluid non-invasively in real time, and so can be used in process applications such as pipes, pressure vessels, and engine bearings.

Figure 19:
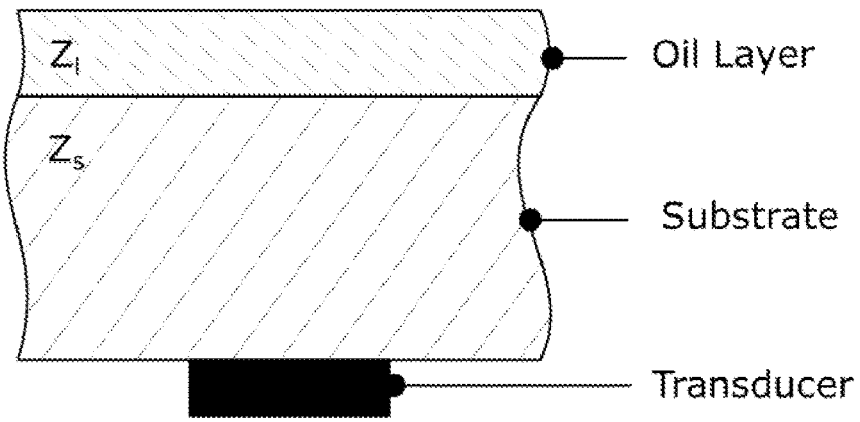
FIG. 19 is a Schematic diagram of an apparatus used to measure the viscosity of a range of Newtonian oils.

FIG. 19 shows a transducer pair (illustrated as a single element) bonded to an aluminium block with a layer of viscous oil on the free surface. The transducer was pulsed continuously using the method as described above and the superimposed standing wave recorded. Several Newtonian viscosity standard oils ranging from 38 cP to 10008 cP were used and the standing wave reflection coefficient, S determined for each.

Figure 20:
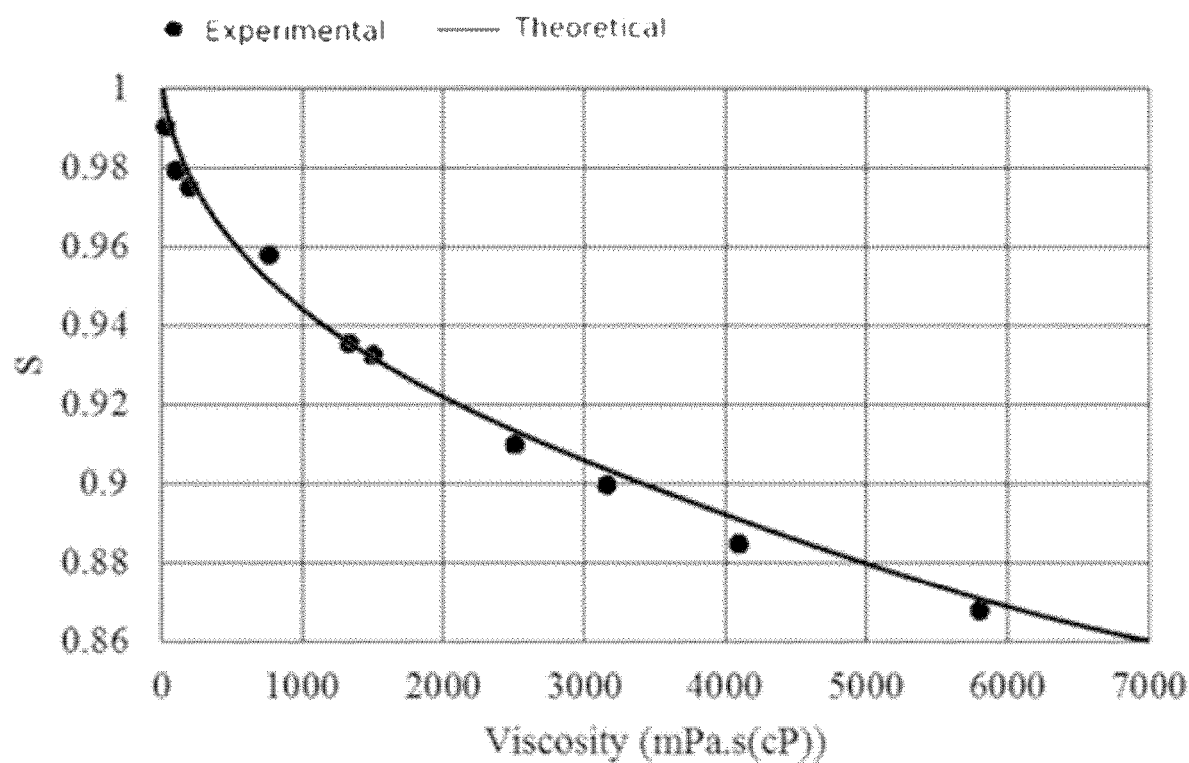
FIG. 20 is a plot of the standing wave reflection coefficient variation with oil viscosity. The model (equations (10) and (22)) are compared with experimental data.

FIG. 20 shows a plot of the variation in S derived from the measurements with the oil viscosity as points. S is sensitive over a very wide range of viscosities. S was also calculated based on viscosities measured with a viscometer and equation (22), and this is plotted over the data as a line. Good agreement is observed.

Table 2 shows the measured standing wave reflection coefficient for the range of oils. This was used in equation (22) to find the reflection coefficient, R, this R was used in equation (10) to find the viscosity. The viscosity measured by a conventional viscometer compares well with that measured by the ultrasonic standing wave method.

TABLE 2

A range of viscosity standard oils were used to evaluate the relationship between standing wave amplitude and viscosity.

| Viscosity Measured by Viscometer, mPa · s (cP) | Standing Wave Reflection Coefficient (S) | Ultrasonic Measured Viscosity mPa · s (cP) |
|---|---|---|
| 29.1 | 0.9904 | 21.1 |
| 102 | 0.9794 | 104 |
| 200 | 0.9751 | 156 |
| 754 | 0.9582 | 466 |
| 1329 | 0.9433 | 1160 |
| 1499 | 0.9456 | 1277 |
| 2508 | 0.9258 | 2348 |
| 3156 | 0.9234 | 2931 |
| 4096 | 0.9145 | 3934 |
| 5798 | 0.9052 | 5258 |

The results demonstrate that the viscosity of a liquid can be determined in situ from the outer surface of a vessel. A clear correlation was seen between the viscosity measured from a conventional viscometer and the standing wave reflection coefficient S.

The invention claimed is:

1. A continuous wave ultrasound analysis device for analyzing a surface of a component, comprising:

a transducer configured to receive ultrasound propagated through the component;

an input configured to receive ultrasound data based on the received ultrasound, the ultrasound data relating to a driving signal and a recorded signal, the driving signal being a continuous wave, swept frequency ultrasound signal applied to the component such that the recorded signal relates to the driving signal as propagated through the component;

a processing section configured to:
derive a standing wave amplitude spectrum from the received ultrasound data by describing an amplitude of the received ultrasound data as a superposition of component waves, wherein an nth component wave has been reflected from the surface n times, determine a reflection coefficient at the surface of the component based on a reference state of the surface and the description of the amplitude of the received ultrasound data compared to the reference state by determining a ratio of the amplitude of the received ultrasound and an amplitude of ultrasound when the surface is in the reference state, and determine a property of an unconstrained layer on the surface based on the determined reflection coefficient; and an output configured to output the determined property of the layer.

2. The device of claim 1, wherein the processing section is configured to approximate the amplitude of the ultrasound using $$A_0 e^{i[\omega(\frac{2nL}{c}-t)-n\phi-(n-1)\phi']} e^{2nL\alpha} R^n R'^{(n-1)}$$

where:
$A_0$ is an amplitude of a driving signal of the ultrasound,
n is a number of passages of the wave through the component,
L is a thickness of the component,
t is time,
$\phi$ is a phase shift at the surface of the component,
$\phi'$ is a phase shift at a face of the component at which the ultrasound is input,
$\omega$ is an angular frequency of the input ultrasound,
$\alpha$ is an attenuation coefficient of component material,
R is a reflection coefficient at the surface of the component,
R' is a reflection coefficient at the face of the component at which the ultrasound is input, and
c is a speed of sound in the component.

3. The device of claim 1, wherein the reference state is a state in which transmission of ultrasound at the surface of the component is negligible.

4. The device of claim 1, wherein the device is arranged to assume that the reference state is a state in which transmission of ultrasound at the surface of the component is negligible.

5. The device of claim 1, wherein the processing section is configured to determine the property of the unconstrained layer based on a determination of a superimposed standing wave reflection coefficient.

6. The device of claim 1, wherein the processing section is configured to evaluate S, where S is given by $$S = \frac{\sum_{n=1}^{\infty} e^{i[\omega(\frac{2nL}{c})-n\phi-(n-1)\phi']} R^n R'^{(n-1)} e^{2nL\alpha}}{\sum_{n=1}^{\infty} e^{i[\omega(\frac{2nL}{c})-(n-1)\phi']} R'^{(n-1)} e^{2nL\alpha}}$$

where:
L is a thickness of the component,
$\phi$ is a phase shift at the surface of the component,
$\phi'$ is a phase shift at a face of the component at which the ultrasound is input,
$\omega$ is an angular frequency of the input ultrasound,
$\alpha$ is an attenuation coefficient of component material,
R is a reflection coefficient at the surface of the component,
R' is a reflection coefficient at the face of the component at which the ultrasound is input, and
c is a speed of sound in the component.

7. The device of claim 6, wherein the property of the unconstrained layer is determined based on S.

8. The device of claim 7, wherein the property of the unconstrained layer is determined by:
determining R based on S, and
determining the property of the unconstrained layer based on R.

9. The device of claim 8, wherein R is taken to be:

$$R = \frac{(1-z_1/z_2)\cos\left(\frac{2\omega h}{c_3}\right) + i(z_3/z_2 - z_1/z_3)\sin\left(\frac{2\omega h}{c_3}\right)}{(1+z_1/z_2)\cos\left(\frac{2\omega h}{c_3}\right) + i(z_3/z_2 + z_1/z_3)\sin\left(\frac{2\omega h}{c_3}\right)}$$

wherein $z_1$, $z_2$, and $z_3$ are acoustic impedances, and $c_3$ is a speed of sound.

10. The device of claim 8, wherein R is taken to be:

$$R = \frac{(z_2-z_1) + i\omega/K(z_1 z_2)}{(z_2+z_1) + i\omega/K(z_1 z_2)}$$

wherein $z_1$ and $z_2$ are acoustic impedances, and K is a stiffness of the layer.

11. The device of claim 6, wherein S is a root mean square superimposed standing wave reflection coefficient.

12. The device of claim 2, wherein the property includes at least one of:
a stiffness of the layer,
a thickness of the layer,
a bulk modulus of the layer,
a speed of sound in the layer,
a density of the layer,
a viscosity of the layer, or
a presence of the layer.

13. The device of claim 1, wherein the property includes a thickness of the layer, and wherein the processing section is configured to determine the thickness based on a shift in a standing wave peak frequency relative to a reference state of the component.

14. The device of claim 13, wherein the determination of the thickness is based on a standing wave peak corresponding to a harmonic having wave mode, n, greater or equal to 2.

15. The device of claim 13, wherein the determination of the thickness uses $$\Delta f_s = \frac{Lc + lc_t + hc_l}{2(L+l+h)^2} - \frac{(Lc + lc_t)}{2(L+l)^2}$$

where:
$\Delta f_s$ is a shift of the standing wave peak corresponding to wave mode 1,
L is a path length of the wave in the component,
c is a speed of sound in the component,
l is a path length of the wave in an emitter for emitting the ultrasound,
$c_t$ is a speed of sound in the emitter,
h is a path length in the layer, and
$c_l$ is a speed of sound in the layer.

16. The device of claim 13, wherein the ultrasound data relates to a measurement state of the component, and the determination of thickness is configured to include:
superimposing the standing wave amplitude spectrum of the measurement state with a standing wave amplitude spectrum of the reference state and
determining the shift in a standing wave peak frequency based on the superimposition.

17. The device of claim 13, wherein the reference state is a state in which transmission of ultrasound at the surface of the component is negligible or assumed to be negligible.

18. The device of claim 1, wherein the ultrasound data is configured to relate to ultrasound transmitted into the component at a first face of the component, and to ultrasound data measured at the first face of the component.

19. The device of claim 1, wherein the ultrasound data is configured to relate to ultrasound swept initially over a first range, and subsequently over a second range, the second range being narrower than, and within, the first range.

20. A method of continuous wave ultrasound analysis for analyzing a surface of a component, comprising:
receiving, at a transducer, ultrasound propagated through the component;
receiving ultrasound data based on the received ultrasound, the ultrasound data relating to a driving signal and a recorded signal, the driving signal being a continuous wave, swept frequency ultrasound signal applied to the component such that the recorded signal relates to the driving signal as propagated through the component;
deriving a standing wave amplitude spectrum from the received ultrasound data by describing an amplitude of the received ultrasound data as a superposition of component waves, wherein an nth component wave has been reflected from the surface n times,
determining a reflection coefficient at the surface of the component based on a reference state of the surface and the description of the amplitude of the received ultrasound data compared to the reference state by determining a ratio of the amplitude of the received ultrasound and an amplitude of ultrasound when the surface is in the reference state, and
determining a property of an unconstrained layer on the surface based on the determined reflection coefficient.

21. The method of claim 20, wherein the deriving includes approximating the amplitude of the ultrasound using $$A_0 e^{i\left[\omega\left(\frac{2nL}{c}-t\right)-n\phi-(n-1)\phi'\right]} e^{2nL\alpha} R^n R'^{(n-1)}$$

where:
$A_0$ is an amplitude of a driving signal of the ultrasound,
n is a number of passages of the wave through the component,
L is a thickness of the component,
t is time,
$\phi$ is a phase shift at the surface of the component,
$\phi'$ a phase shift at a face of the component at which the ultrasound is input,
$\omega$ is an angular frequency of the input ultrasound,
$\alpha$ is an attenuation coefficient of component material,
R is a reflection coefficient at the surface of the component,
R' is a reflection coefficient at the face of the component at which the ultrasound is input, and
c is a speed of sound in the component.

22. The method of claim 20, wherein the property includes a thickness of the layer, and wherein the processing section is to determine the thickness based on a shift in a standing wave peak frequency relative to a reference state of the component.

23. A non-transitory computer readable medium that is not a carrier wave or signal including instructions to cause a computer to execute a method of continuous wave ultrasound analysis for analyzing a surface of a component, the executed method comprising:
causing a transducer to receive ultrasound propagated through the component;
receiving ultrasound data based on the received ultrasound, the ultrasound data relating to a driving signal and a recorded signal, the driving signal being a continuous wave, swept frequency ultrasound signal applied to the component such that the recorded signal relates to the driving signal as propagated through the component;
deriving a standing wave amplitude spectrum from the received ultrasound data by describing an amplitude of the received ultrasound data as a superposition of component waves, wherein an nth component wave has been reflected from the surface n times, determining a reflection coefficient at the surface of the component based on a reference state of the surface and the description of the amplitude of the received ultrasound data compared to the reference state by determining a ratio of the amplitude of the received ultrasound and an amplitude of ultrasound when the surface is in the reference state, and
determining a property of an unconstrained layer on the surface based on the determined reflection coefficient.

* * * * *